United States Patent
Qin et al.

(10) Patent No.: US 10,066,035 B2
(45) Date of Patent: Sep. 4, 2018

(54) CATALYST SYSTEMS AND METHODS FOR PREPARATION OF 1,4-POLYBUTADIENE RUBBER

(71) Applicant: Bridgestone Corporation, Chuo-ku (JP)

(72) Inventors: Zengquan Qin, Copley, OH (US); Christine M. Rademacher, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 15 days.

(21) Appl. No.: 15/371,950

(22) Filed: Dec. 7, 2016

(65) Prior Publication Data
US 2017/0158787 A1 Jun. 8, 2017

Related U.S. Application Data

(60) Provisional application No. 62/263,860, filed on Dec. 7, 2015.

(51) Int. Cl.
*C08F 136/06* (2006.01)
*B01J 31/28* (2006.01)

(52) U.S. Cl.
CPC .................... *C08F 136/06* (2013.01)

(58) Field of Classification Search
USPC ............................................. 526/133, 169.1
See application file for complete search history.

(56) References Cited

U.S. PATENT DOCUMENTS

| | | | |
|---|---|---|---|
| 3,170,907 | A | 2/1965 | Kenichi et al. |
| 3,438,958 | A | 4/1969 | Throckmorton |

(Continued)

FOREIGN PATENT DOCUMENTS

| | | |
|---|---|---|
| CN | 1093375 A | 10/1994 |
| CN | 1324873 A | 12/2001 |

(Continued)

OTHER PUBLICATIONS

Yoneda et al., "Catalytic Behaviors of Borontrifluoride Complex in the Alkylation of Benzene Homologues and in the Oligomerization of Propylene", Hokkadio University Publication 1973.

(Continued)

*Primary Examiner* — Mark Kaucher
*Assistant Examiner* — Henry Hu
(74) *Attorney, Agent, or Firm* — Meredith E. Hooker; Joshua Lorentz

(57) ABSTRACT

Embodiments of methods of producing 1,4-polybutadiene comprise polymerizing a solution comprising conjugated diene monomer and organic solvent to yield 1,4-polybutadiene having a cis content of between about 92% to about 98%, a vinyl content of about 1% to about 5%, a trans content of about 1 to about 3%, a molecular weight distribution (MWD) of about 3 to about 5, and a Mooney viscosity ($ML_{1+4}$) at 100° C. of less than 60. The polymerization achieves over an 80% conversion of the conjugated diene monomer when catalyzed with a catalyst comprising at least one nickel compound, at least one aluminum activator compound, and a mixture of $BF_3$.hexanol and $BF_3.H_2O$. For the catalyst, the molar ratio of $Ni/H_2O$ is from about 0.05 to about 20 and the molar ratio of $BF_3/H_2O$ is from about 1.8 to about 500.

14 Claims, 1 Drawing Sheet

(56) References Cited

U.S. PATENT DOCUMENTS

| | | |
|---|---|---|
| 3,464,965 A | 9/1969 | Hidetoshi et al. |
| 3,483,177 A | 12/1969 | Throckmorton et al. |
| 3,528,957 A | 9/1970 | Throckmorton et al. |
| 4,155,880 A | 5/1979 | Saltman et al. |
| 4,383,097 A | 5/1983 | Castner |
| 4,501,866 A | 2/1985 | Roggeman et al. |
| 4,522,988 A | 6/1985 | Kang et al. |
| 4,533,711 A | 8/1985 | Takeuchi et al. |
| 4,605,808 A | 8/1986 | Samson |
| 4,983,695 A | 1/1991 | Kuzma et al. |
| 5,100,982 A | 3/1992 | Castner |
| 5,412,045 A | 5/1995 | Osman et al. |
| 5,451,646 A | 9/1995 | Castner |
| 5,686,543 A | 11/1997 | Yasuda et al. |
| 5,955,553 A | 9/1999 | Oziomek et al. |
| 5,962,604 A | 10/1999 | Rath |
| 6,013,746 A | 1/2000 | Jang et al. |
| 6,586,542 B2 | 7/2003 | Jang et al. |
| 6,596,825 B1 | 7/2003 | Miller |
| 6,723,888 B2 | 4/2004 | Roggeman et al. |
| 6,753,389 B1 | 6/2004 | Rath et al. |
| 7,081,504 B2 | 7/2006 | Rachita et al. |
| 7,820,580 B2 * | 10/2010 | Qin ............... B01J 31/0201 502/114 |
| 8,436,111 B2 | 5/2013 | Pawlow et al. |
| 8,701,728 B2 * | 4/2014 | Qin ..................... B60C 1/00 152/525 |
| 8,987,395 B2 | 3/2015 | McCauley et al. |
| 2012/0165485 A1 | 6/2012 | Kim et al. |
| 2013/0274430 A1 | 10/2013 | McCauley et al. |

FOREIGN PATENT DOCUMENTS

| | | |
|---|---|---|
| CN | 1358776 A | 7/2002 |
| CN | 1148390 C | 5/2004 |
| CN | 1149235 C | 5/2004 |
| EP | 093075 B1 * | 12/1986 |
| EP | 0093075 B1 | 12/1986 |
| EP | 646103 B1 | 8/1997 |
| JP | S5624412 A | 3/1981 |

OTHER PUBLICATIONS

Defrees et al., "A Theoretical Study of the Fluorohydroxy Boranes $BF_n(OH)_{3-n}$", Inorganica Chemica Acta, vol. 47, pp. 19-23, 1980.

Furukawa, "Mechanism of Diene Polymerization", Pure & Applied Chem, vol. 42, Issue 4, pp. 495-508, 1975.

Lee et al., "Polymerization of butadiene in toluene with nickel (II) stearate-diethyl aluminum chloride catalyst", Chem Eng Commun. vol. 24, Issue 1, 1983.

* cited by examiner

CATALYST SYSTEMS AND METHODS FOR PREPARATION OF 1,4-POLYBUTADIENE RUBBER

CROSS-REFERENCE TO RELATED APPLICATIONS

This application claims priority to U.S. Provisional Application No. 62/263,860, filed Dec. 7, 2015, which is incorporated by reference herein in its entirety.

TECHNICAL FIELD

Embodiments of the present disclosure are generally related to 1,4-polybutadiene rubber, and are specifically related to improved catalyst systems and methods for producing 1,4 polybutadiene rubber via the inclusion of water in the catalyst.

BACKGROUND

In tire manufacturing, high cis 1,4-polybutadiene (e.g., rubber with a cis 1,4 linkage content of 95% or greater) is a rubber commonly used for its excellent mechanical properties. Nickel-based catalysts are generally utilized in the synthesis of high cis 1,4-polybutadiene rubbers. Nickel-based catalysts comprise a nickel compound, an organoaluminum compound, and a halogen compound. Nickel-based catalysts have utilized boron based halogen compounds, such as $BF_3$, with an organic solvent; however, conventional polymerization processes remove all water from the solvent, because of concerns that water will hydrolyze the $BF_3$, thereby degrading $BF_3$ and producing undesirable byproducts such as boric acid and fluoroboric acid. Other polymerization processes have utilized some amount of water; however, the water is not incorporated in the $BF_3$ component of the catalyst in these polymerization processes.

Accordingly, a continual need exists for improved catalyst systems which utilize water in the boron component of the catalyst to increase the polymerization rate while regulating the molecular weight or Mooney viscosity of the 1,4-polybutadiene.

SUMMARY

Embodiments of the present disclosure are directed to methods of producing 1,4-polybutadiene using improved catalysts comprising a water containing $BF_3$ component. By the inclusion of water, many benefits are achieved, for example, the polymerization rate may be increased and the Mooney viscosity and molecular weight distribution may be regulated.

According to one embodiment, method of producing 1,4-polybutadiene is provided. The method comprises polymerizing a solution comprising conjugated diene monomer and organic solvent to yield 1,4-polybutadiene having a cis content of between about 92% to about 98%, a vinyl content of about 1% to about 4%, a trans content of about 1 to about 4%, a molecular weight distribution (MWD) of about 3 to about 5, and a Mooney viscosity ($ML_{1+4}$) at 100° C. of less than 60. The polymerization achieves over an 80% conversion of the conjugated diene monomer when catalyzed with a catalyst comprising at least one nickel compound, at least one aluminum activator compounds, and a mixture of $BF_3$.hexanol and $BF_3.H_2O$. For the catalyst, the molar ratio of $Ni/H_2O$ is from about 0.05 to about 20 and the molar ratio of $BF_3/H_2O$ is from about 1.8 to about 500.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWINGS

The following detailed description of specific embodiments of the present disclosure can be best understood when read in conjunction with the drawings enclosed herewith.

Figure 1:
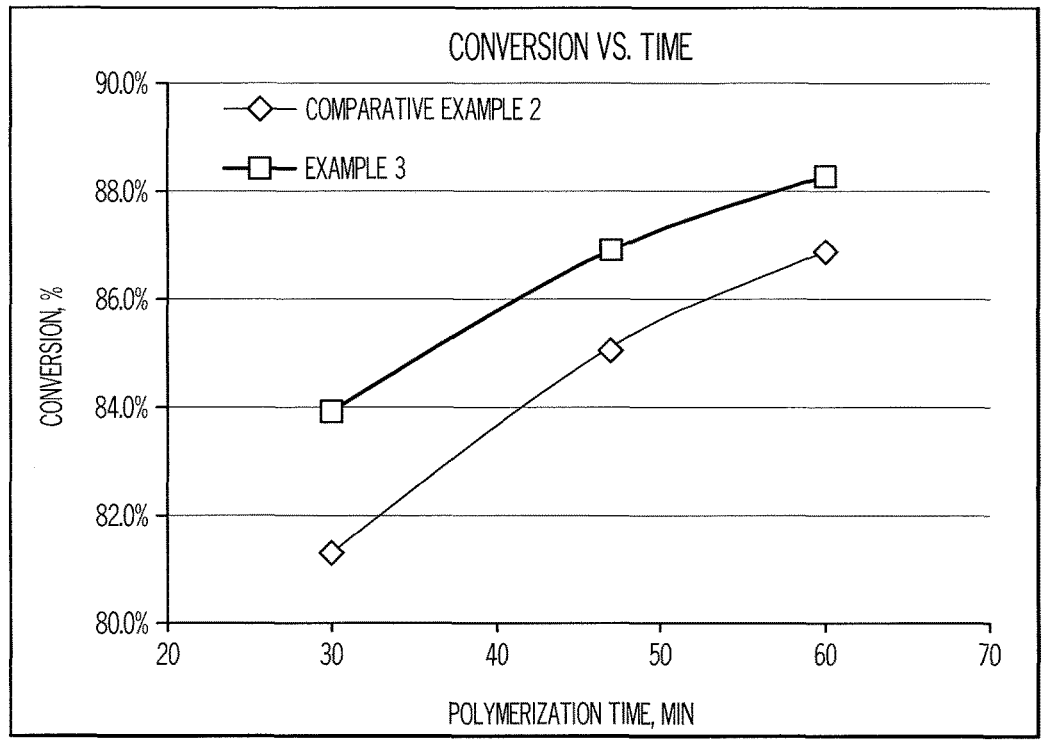
FIG. 1 is a graph depicting the improvement in conversion of 1,3-butadiene to 1,4-polybutadiene when using the present catalyst having a mixture of $BF_3$.hexanol and $BF_3$.water versus a conventional catalyst comprising anhydrous $BF_3$.hexanol according to one or more embodiments of the present disclosure.

The embodiments set forth in the drawings are illustrative in nature and not intended to be limiting of the embodiments defined by the claims. Moreover, individual features of the drawings will be more fully apparent and understood in view of the detailed description.

DETAILED DESCRIPTION

Embodiments of the present disclosure are directed to methods of producing 1,4-polybutadiene using an improved catalyst having increased water content in $BF_3$ component of the catalyst. The methods involve polymerizing a solution comprising conjugated diene monomer (e.g., 1,3-butadiene) in organic solvent to yield 1,4-polybutadiene having a cis content of between about 92% to about 98%, a vinyl content of about 1% to about 4%, a trans content of about 1 to about 4%, an MWD of about 3 to about 5, and a Mooney viscosity ($ML_{1+4}$) at 100° C. of less than 60. The polymerization is catalyzed with a catalyst comprising at least one nickel compound, at least one aluminum activator compound, and a mixture of $BF_3$.hexanol and $BF_3.H_2O$. The molar ratio of $Ni/H_2O$ is from about 0.05 to about 20 and the molar ratio of $BF_3/H_2O$ is from about 1.8 to about 500.

As used herein, "cis content" refers to the percentage of cis 1,4 linkages in the 1,4-polybutadiene. Similarly, "trans content" refers to the percentage of trans 1,4 linkages in the 1,4-polybutadiene. Finally, "vinyl content" refers to the percentage of vinyl linkages in the 1,4-polybutadiene. MWD is defined as Mw/Mn with Mw being a weight average molecular weight and Mn being a number average molecular weight.

Further as used herein, the polymerization process utilized herein may be called "solution polymerization", which means a polymerization process carried out in a separate organic solvent. Unlike "bulk polymerization" wherein the conjugated diene monomer is the predominant "solvent", "solution polymerization" involves a separate organic solvent such that more than 5% by weight of the separate organic solvent is present in the solution of conjugated diene monomer and organic solvent. In the present embodiments, the solution polymerization may achieve at least an 80%, or at least an 85% conversion of 1,3-butadiene to 1,4-polybutadiene.

As used herein, "$BF_3.H_2O$" is a complex that may encompass various hydrate complexes of $BF_3$, for example, the monohydrate ($BF_3.H_2O$), dihydrate ($BF_3.2H_2O$), the trihydrate ($BF_3.3H_2O$), or combinations thereof.

The conjugated diene monomer(s) used herein refers to monomer compositions having at least two double bonds that are separated by a single bond. The processes discussed herein may use at least one conjugated diene monomer containing less than 20 carbon atoms (i.e., 4 to 19 carbons). Examples of conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. While all monomers are considered suitable, the present discussion will focus on the 1,3-butadiene monomer.

The organic solvent may desirably include compounds that are inert with respect to the catalyst systems. Examples of organic solvent may include suitable aliphatic solvents, such as n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and the like. In a specific embodiment, the organic solvent is hexane.

In further embodiment, the 1,4-polybutadiene may have a cis content of about 93% to about 97%, or about 95% to about 97%. Moreover, the 1,4-polybutadiene may have a trans content between 1 to about 3, or about 1.5% to about 2.5%, or less than about 2%. Furthermore, the 1,4-polybutadiene may have a vinyl content between about 1% to about 3%, or between about 1% to about 2%, or between about 2% to about 3%.

As stated above, the present improved catalysts regulate the molecular weight or the Mooney viscosity ($ML_{1+4}$) at 100° C. In one or more embodiments, the Mooney viscosity ($ML_{1+4}$) may be less than 60, or less than about 50, or less than about 40. Moreover, the MWD may be from about 3 to about 5, or about 3 to about 4.5, or about 3.5 to about 4.5.

As mentioned above, the catalyst system employed in the present disclosure may include a nickel compound. Various nickel compounds or mixtures thereof can be employed. In one or more embodiments, these nickel compounds may be soluble in hydrocarbon solvents such as aromatic hydrocarbons, aliphatic hydrocarbons, or cycloaliphatic hydrocarbons. In other embodiments, hydrocarbon-insoluble nickel compounds, which can be suspended in the polymerization medium to form catalytically active species, may also be useful.

The nickel atom in the nickel compounds can be in various oxidation states including but not limited to the 0, +2, +3, and +4 oxidation states. Suitable nickel compounds include, but are not limited to, nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

Suitable nickel carboxylates include nickel formate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Suitable nickel carboxylate borates include compounds defined by the formulae $(RCOONiO)_3B$ or $(RCOONiO)_2B$ (OR), where each R, which may be the same or different, is a hydrogen atom or a mono-valent organic group. In one embodiment, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Nickel carboxylate borate may include those disclosed in U.S. Pat. No. 4,522,988, which is incorporated herein by reference. Specific examples of nickel carboxylate borate include nickel(II) neodecanoate borate, nickel(II) hexanoate borate, nickel(II) naphthenate borate, nickel(II) stearate borate, nickel(II) octoate borate, nickel(II) 2-ethylhexanoate borate, and mixtures thereof.

Suitable nickel organophosphates include nickel dibutyl phosphate, nickel dipentyl phosphate, nickel dihexyl phosphate, nickel diheptyl phosphate, nickel dioctyl phosphate, nickel bis(1-methylheptyl)phosphate, nickel bis(2-ethylhexyl)phosphate, nickel didecyl phosphate, nickel didodecyl phosphate, nickel dioctadecyl phosphate, nickel dioleyl phosphate, nickel diphenyl phosphate, nickel bis(p-nonylphenyl)phosphate, nickel butyl (2-ethylhexyl)phosphate, nickel (1-methylheptyl)(2-ethylhexyl)phosphate, and nickel (2-ethylhexyl)(p-nonylphenyl)phosphate.

Suitable nickel organophosphonates include nickel butyl phosphonate, nickel pentyl phosphonate, nickel hexyl phosphonate, nickel heptyl phosphonate, nickel octyl phosphonate, nickel (1-methylheptyl)phosphonate, nickel (2-ethylhexyl)phosphonate, nickel decyl phosphonate, nickel dodecyl phosphonate, nickel octadecyl phosphonate, nickel oleyl phosphonate, nickel phenyl phosphonate, nickel (p-nonylphenyl)phosphonate, nickel butyl butylphosphonate, nickel pentyl pentylphosphonate, nickel hexyl hexylphosphonate, nickel heptyl heptylphosphonate, nickel octyl octylphosphonate, nickel (1-methylheptyl)(1-methylheptyl) phosphonate, nickel (2-ethylhexyl)(2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl)(p-nonylphenyl)phosphonate, nickel butyl (2-ethylhexyl)phosphonate, nickel (2-ethylhexyl)butylphosphonate, nickel (1-methylheptyl)(2-ethylhexyl)phosphonate, nickel (2-ethylhexyl)(1-methylheptyl)phosphonate, nickel (2-ethylhexyl)(p-nonylphenyl)phosphonate, and nickel (p-nonylphenyl)(2-ethylhexyl)phosphonate.

Suitable nickel organophosphinates include nickel butylphosphinate, nickel pentylphosphinate, nickel hexylphosphinate, nickel heptylphosphinate, nickel octylphosphinate, nickel (1-methylheptyl)phosphinate, nickel (2-ethylhexyl) phosphinate, nickel decylphosphinate, nickel dodecylphosphinate, nickel octadecylphosphinate, nickel oleylphosphinate, nickel phenylphosphinate, nickel (p-nonylphenyl) phosphinate, nickel dibutylphosphinate, nickel dipentylphosphinate, nickel dihexylphosphinate, nickel diheptylphosphinate, nickel dioctylphosphinate, nickel bis (1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis (p-nonylphenyl)phosphinate, nickel butyl(2-ethylhexyl)

phosphinate, nickel (1-methylheptyl)(2-ethylhexyl)phosphinate, and nickel (2-ethylhexyl)(p-nonylphenyl)phosphinate.

Suitable nickel carbamates include nickel dimethylcarbamate, nickel diethylcarbamate, nickel diisopropylcarbamate, nickel dibutylcarbamate, and nickel dibenzylcarbamate. Suitable nickel dithiocarbamates include nickel dimethyldithiocarbamate, nickel diethyldithiocarbamate, nickel diisopropyldithiocarbamate, nickel dibutyldithiocarbamate, and nickel dibenzyldithiocarbamate. Suitable nickel xanthates include nickel methylxanthate, nickel ethylxanthate, nickel isopropylxanthate, nickel butylxanthate, and nickel benzylxanthate. Suitable nickel β-diketonates include nickel acetylacetonate, nickel trifluoroacetylacetonate, nickel hexafluoroacetylacetonate, nickel benzoylacetonate, and nickel 2,2,6,6-tetramethyl-3,5-heptanedionate. Suitable nickel alkoxides or aryloxides include nickel methoxide, nickel ethoxide, nickel isopropoxide, nickel 2-ethylhexoxide, nickel phenoxide, nickel nonylphenoxide, and nickel naphthoxide.

Suitable nickel halides include nickel fluoride, nickel chloride, nickel bromide, and nickel iodide; suitable nickel pseudo-halides include nickel cyanide, nickel cyanate, nickel thiocyanate, nickel azide, and nickel ferrocyanide; and suitable nickel oxyhalides include nickel oxyfluoride, nickel oxychloride, and nickel oxybromide. In certain embodiments, a Lewis base such as tetrahydrofuran or an alcohol may be used as an aid for solubilizing these classes of nickel compounds in inert organic solvents. Where nickel fluoride, nickel oxyfluoride, or other nickel compounds containing a fluorine atom are employed, the nickel compounds may also serve as part of the fluorine source in the above-mentioned catalyst system.

The term organonickel compound may refer to any nickel compound containing at least one nickel-carbon bond. Suitable organonickel compounds include bis(cyclopentadienyl) nickel (also called nickelocene), bis(pentamethylcyclopentadienyl)nickel (also called decamethylnickelocene), bis(tetramethylcyclopentadienyl)nickel, bis(ethylcyclopentadienyl)nickel, bis(isopropylcyclopentadienyl)nickel, bis(pentadienyl)nickel, bis(2,4-dimethylpentadienyl)nickel, (cyclopentadienyl)(pentadienyl)nickel, bis(1,5-cyclooctadiene)nickel, bis(allyl)nickel, bis(methallyl)nickel, and bis(crotyl)nickel.

In an exemplary embodiment, the nickel compound is a nickel borate, for example, nickel boroacylate.

Further as stated above, the catalyst system may comprise at least one aluminum activator compound. The aluminum activator compound may include at least one organoaluminum compound. As used herein, the term organoaluminum compound refers to any aluminum compound containing at least one aluminum-carbon bond. In one or more embodiments, organoaluminum compounds that are soluble in a hydrocarbon solvent can be employed.

In one or more embodiments, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom (e.g., a fluorine, chlorine, bromine, or iodine atom), a carboxylate group, an alkoxide group, or an aryloxide group, and where n can be an integer in the range of from 1 to 3. Where the organoaluminum compound includes a fluorine atom, the organoaluminum compound can serve as an alkylating agent and at least a portion of the fluorine source in the catalyst system. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_3$, include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the aluminum activator compound can comprise trihydrocarbylaluminum, dihydrocarbylaluminum hydride, and/or hydrocarbylaluminum dihydride compounds.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum. In an exemplary embodiment, the aluminum activator compound is triisobutyl aluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, benzyl-n-octylaluminum chloride, diethylaluminum fluoride, di-n-propylaluminum fluoride, diisopropylaluminum fluoride, di-n-butylaluminum fluoride, diisobutylaluminum fluoride, di-n-octylaluminum fluoride, diphenylaluminum fluoride, di-p-tolylaluminum fluoride, dibenzylaluminum fluoride, phenylethylaluminum fluoride, phenyl-n-propylaluminum fluoride, phenylisopropylaluminum fluoride, phenyl-n-butylaluminum fluoride, phenylisobutylaluminum fluoride, phenyl-n-octylaluminum fluoride, p-tolylethylaluminum fluoride, p-tolyl-n-propylaluminum fluoride, p-tolylisopropylaluminum fluoride, p-tolyl-n-butylaluminum fluoride, p-tolylisobutylaluminum fluoride, p-tolyl-n-octylaluminum fluoride, benzylethylaluminum fluoride, benzyl-n-propylaluminum fluoride, benzylisopropylaluminum fluoride, benzyl-n-butylaluminum fluoride, benzylisobutylaluminum fluoride, and benzyl-n-octylaluminum fluoride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, n-octylaluminum dichloride, ethylaluminum difluoride, n-propylaluminum difluoride, isopropylaluminum difluoride, n-butylaluminum difluoride, isobutylaluminum difluoride, and n-octylaluminum difluoride.

Other organoaluminum compounds may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present disclosure is aluminoxanes, for example, oligomeric linear aluminoxanes. U.S. Publication No. 2008/0182954 and U.S. Pat. No. 8,987,395, which are incorporated herein by reference in its entirety, provide other examples of aluminoxanes and organoaluminum compounds.

Organomagnesium and organozinc compounds are also considered as substitutes for the organoalumimum. Examples of these organomagnesium and organozinc are provided in US Publication 20140073751, which is incorporated by reference herein in its entirety.

Further as stated above, the catalyst system may comprise a fluorine source, specifically a mixture of boron trifluoride ($BF_3$) with at least one alcohol and water. The $BF_3$ will form a complex with the alcohol and water as denoted herein as $BF_3$.alcohol/$BF_3$.$H_2O$ or, in further embodiments, $BF_3$.hexanol/$BF_3$.$H_2O$. In an exemplary embodiment, the alcohol is 1-hexanol. Without being bound by theory, 1-hexanol may be beneficial due to its six carbon hydrocarbon chain. Specifically, since 1-hexanol is more non-polar due to its six carbon hydrocarbon chain, it is also desirably miscible with the above described organic solvents, such as hexane.

Further, the use of water with 1-hexanol was surprisingly found to increase catalytic activity. Previously, water was considered problematic, because water may hydrolyze the $BF_3$ to produce undesirable byproducts such as boric acid or fluoroboric acid. By hydrolyzing the $BF_3$, there is less $BF_3$ available for catalyzing the conjugated diene polymerization. Thus, when 1-hexanol was used for complexing with the $BF_3$, water has been conventionally removed from the 1-hexanol via a drying column with desiccant.

That being said, it was surprisingly found that untreated hexanol or hexanol plus added water increased the conversion and speed of the conjugated diene polymerization. Thus, the present embodiments simplify production processes and eliminate production costs by eliminating the water removal step, but also surprisingly achieve improved catalytic activity via the presence of water.

In one or more embodiments, the molar ratio of $BF_3$/$H_2O$ is about 2 to about 100, or about 2 to about 15. In further embodiments, the molar ratio of Ni/$H_2O$ is about 0.05 to about 15, or about 0.05 to about 0.5. Alternatively, the weight % of $H_2O$ per solution of hexanol and $H_2O$ is about 0.01% to about 10%, or about 1% to about 8% of $H_2O$ per solution of hexanol and $H_2O$ is about 0.01% to about 10%.

As explained further in the examples below, the active catalyst is formed when the nickel compound, the aluminum activator, and the mixture of $BF_3$.hexanol and $BF_3$.$H_2O$ are introduced or brought together. The resulting active catalyst is capable of polymerizing conjugated diene monomer to form a high cis-1,4-polybutadiene.

EXAMPLES

The following examples illustrate the synthesis of 1,4-polybutadiene using various water amounts in the boron containing catalyst.

Example 1: Co-Catalyst

To a 20 mL dry bottle purged with nitrogen, 9.498 g of $BF_3$.hexanol (33.4% wt $BF_3$, 5.17 M) was added, then 1.195 g of $BF_3$.$2H_2O$ (65.0% wt $BF_3$, 15.6 M) was added. After thorough mixing, a clear solution was obtained with 5.91 M of $BF_3$ and 2.36 M of $H_2O$.

Comparative Example 2: Comparative 1,4-Polybutadiene Rubber

To a dry 2-gallon reactor purged with nitrogen, hexane and then 1,3-butadiene (Bd) blend in hexane was added, resulting in a 18.0 wt % Bd solution in hexane (3856 g, 12.83 mol Bd). The solution was maintained at 25° C. Then, 2.776 millimole (mmol) of triisobutylaluminum and 0.347 mmol of nickel boroacylate (0.050 mmol/100 g Bd) were sequentially added to a nitrogen-purged bottle containing small amount of Bd solution in hexane, yielding an orange solution. The solution was immediately charged into the reactor, followed by 5.00 mmol of $BF_3$.hexanol solution. Then the jacket temperature of the reactor was set at 85° C. Polymerization was allowed to take place for certain time, and the reaction mixture was dropped into a 750 mL nitrogen purged bottle. The polymer cement was treated with isopropanol containing 2,6-di-tert-butyl-4-methylphenol in order to deactivate the catalyst and coagulate the polybutadiene. The polybutadiene was then dried in a drum-dryer at 120° C.

Example 3: 1,4-Polybutadiene Rubber Produced by Co-Catalyst of Example 1

To a dry 2-gallon reactor purged with nitrogen, hexane and then 1,3-butadiene (Bd) blend in hexane was added, resulting in a 18.0 wt % Bd solution in hexane (3856 g, 12.83 mol Bd). The solution was maintained at 25° C. Then, 2.776 millimole (mmol) of triisobutylaluminum and 0.347 mmol of nickel boroacylate (0.050 mmol/100 g Bd) were sequentially added to a nitrogen-purged bottle containing small amount of Bd solution in hexane, yielding an orange solution. The solution was immediately charged into the reactor, followed by 5.00 mmol of $BF_3$ complex mixture of $BF_3$.hexanol and $BF_3$.$2H_2O$ made in example 1. Then, the jacket temperature of the reactor was set at 85° C. Polymerization was allowed to take place for certain time, and the reaction mixture was dropped into a 750 mL nitrogen purged bottle. The polymer cement was treated with isopropanol containing 2,6-di-tert-butyl-4-methylphenol in order to deactivate the catalyst and coagulate the polybutadiene. The polybutadiene was then dried in a drum-dryer at 120° C. The catalyst compositions of Comparative Example 2 and Example 3 are provided in Table 1. The properties of the 1,4-polybutadienes produced from the catalysts of Comparative Example 2 and Example 3 are provided in Table 2 below.

TABLE 1

Catalyst Compositions of Comparative Example 2 and Example 3

|  | Comparative Example 2 | Example 3 |
| --- | --- | --- |
| $H_2O$/($H_2O$ + Hexanol) (wt %) | <0.005% | 6.20% |
| $BF_3$ Complexes, $BF_3$ (wt %) | 33.4% | 36.9% |
| $BF_3$:$H_2O$, molar ratio | >3000 | 2.51 |
| Ni:$H_2O$, molar ratio | >81 | 0.174 |
| triisobutyl aluminum:Ni, molar ratio | 8.0 | 8.0 |
| $BF_3$:Ni, molar ratio | 14.41 | 14.41 |

TABLE 2

Properties of 1,4 polybutadiene produced from catalysts of Table 1

|  | Comparative Example 2 | | | Example 3 | | |
| --- | --- | --- | --- | --- | --- | --- |
| Polymerization time, min | 30 | 47 | 60 | 30 | 47 | 60 |
| Conversion, % | 81.3% | 85.1% | 86.9% | 83.9% | 86.9% | 88.3% |
| Mooney ($ML_{1+4}$@100 C.) | 64.10 | 63.00 | 63.10 | 42.40 | 43.10 | 43.00 |

Referring to FIG. 1 and Table 2 above, the polybutadiene produced from a catalyst with anhydrous $BF_3$ complex (Comparative Example 2), achieves less polymer conversion at 30 minutes, 47 minutes, and 60 minutes than the polybutadiene produced from a catalyst with $BF_3$ complex that includes water (Example 3). Surprisingly, this demonstrates that the addition of water facilitates further polymerization, and also indicates that the water is not degrading the $BF_3$ via hydrolysis reactions. Moreover as shown, the polybutadiene produced from the Example 3 has a lower Mooney viscosity at 100° C.

Comparative Catalyst Example 4 and Catalyst Examples 5-8

To a dried bottle (180 mL) purged with nitrogen, anhydrous 1-hexanol (water <50 ppm) or a mixture of 1-hexanol and water was added. Then, $BF_3$ gas was slowly charged into the bottle at room temperature under vigorous stirring, yielding a colorless or pale yellow solution.

To a dry 2-gallon reactor purged with nitrogen, hexane and then a 1,3-butadiene (Bd) blend in hexane was added, resulting in a 18.0 wt % Bd solution in hexane (3856 g, 12.83 mol Bd). The solution was maintained at 22° C. Then, 5.008 millimole (mmol) of triisobutylaluminum and 0.237 mmol of nickel boroacylate (0.034 mmol/100 g Bd) were sequentially added to a nitrogen-purged bottle containing small amount of Bd solution in hexane, yielding an orange solution. The solution was immediately charged into the reactor, followed by 8.764 mmol of $BF_3$.hexanol solution. Then the jacket temperature of the reactor was set at 85° C. Polymerization was allowed to take place for certain time, and the reaction mixture was dropped into a 750 mL nitrogen purged bottle. The polymer cement was treated with isopropanol containing 2,6-di-tert-butyl-4-methylphenol in order to deactivate the catalyst and coagulate the polybutadiene. The polybutadiene was then dried in a drum-dryer at 120° C. The catalyst compositions of Comparative Example 4 and Examples 5-8 are provided in Table 3 below. The 1,4-polybutadienes produced from Comparative Example 4 and Examples 5-8 are Comparative Example 9 and Examples 10-13, respectively. The properties of the 1,4-polybutadienes of Comparative Example 9 and Examples 10-13 are provided in Table 4A and 4B below.

TABLE 3

Catalyst Compositions of Comparative Example 4 and Examples 5-8

|  | Comparative Example 4 | Example 5 | Example 6 | Example 7 | Example 8 |
| --- | --- | --- | --- | --- | --- |
| $H_2O$/($H_2O$ + Hexanol) (wt %) | <0.005% | 1.44% | 1.95% | 3.90% | 6.84% |
| $BF_3$ Complexes, $BF_3$ (wt %) | 36.2% | 36.0% | 36.0% | 37.9% | 37.2% |
| $BF_3$/$H_2O$, molar ratio | >3000 | 10.43 | 7.66 | 4.16 | 2.30 |
| Ni/$H_2O$, molar ratio | >81 | 0.2819 | 0.2070 | 0.1124 | 0.0622 |
| triisobutyl aluminum/Ni, molar ratio | 21.13 | 21.13 | 21.13 | 21.13 | 21.13 |
| $BF_3$/Ni, molar ratio | 36.98 | 36.98 | 36.98 | 36.98 | 36.98 |

TABLE 4A

Properties of 1,4 polybutadiene produced from catalysts of Table 3

|  | Comparative Example 9 | | Example 10 | | Example 11 | |
| --- | --- | --- | --- | --- | --- | --- |
| Polymerization Time (min) | 40 | 60 | 40 | 60 | 40 | 60 |
| Mooney (ML$_{1+4}$@100 C.) | 52.70 | 53.00 | 48.50 | 47.90 | 44.10 | 44.70 |
| Mn | 71176 | 70245 | 71591 | 70903 | 69547 | 68347 |
| Mw | 317977 | 318073 | 302263 | 304168 | 285991 | 284037 |
| Mp | 173383 | 175941 | 165412 | 166544 | 155581 | 154527 |
| MWD (Mw/Mn) | 4.47 | 4.53 | 4.22 | 4.29 | 4.11 | 4.16 |
| Cis content | 96.2% | 96.1% | 96.2% | 96.2% | 96.0% | 96.0% |
| Trans content | 1.7% | 1.7% | 1.6% | 1.6% | 1.7% | 1.7% |
| Vinyl content | 2.1% | 2.1% | 2.2% | 2.2% | 2.3% | 2.3% |

TABLE 4B

Properties of 1,4 polybutadiene produced from catalysts of Table 3 (cont'd)

|  | Example 12 | | Example 13 | |
| --- | --- | --- | --- | --- |
|  | Polymerization Time (min) | | | |
|  | 40 | 60 | 40 | 60 |
| Mooney (ML$_{1+4}$@100 C.) | 40.10 | 39.90 | 31.30 | 31.10 |
| Mn | 69924 | 67749 | 63624 | 62396 |
| Mw | 274798 | 266483 | 230922 | 232589 |
| Mp | 149369 | 144390 | 130641 | 131523 |
| MWD (Mw/Mn) | 3.93 | 3.93 | 3.63 | 3.73 |
| Cis content | 95.9% | 95.9% | 95.6% | 95.5% |
| Trans content | 1.7% | 1.7% | 1.7% | 1.7% |
| Vinyl content | 2.4% | 2.4% | 2.7% | 2.8% |

Figure 2:
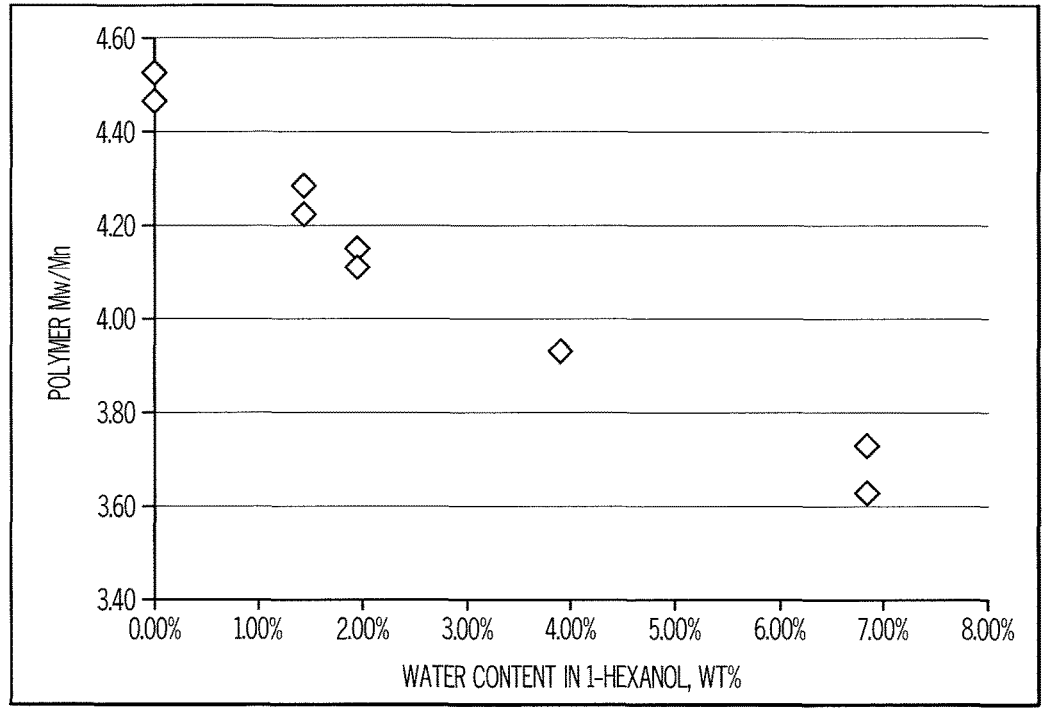
FIG. 2 is a graph depicting the reduction of the molecular weight distribution (MWD) as water is increased in the catalyst according to one or more embodiments of the present disclosure.

As shown in Tables 4A and 4B and FIG. 2, the increase of water reduces the Mooney and the MWD. As shown in FIG. 2, there is essentially an inverse relationship between the inclusion of water and the MWD ($M_w/M_n$). For example, Example 8, which has a BF$_3$/H$_2$O molar ratio of 2.30, yields a polybutadiene (Example 13) with an MWD of 3.73 at 60 minutes, whereas anhydrous BF$_3$ Comparative Example 4, which has a BF$_3$/H$_2$O molar ratio of greater than 3000, yields a polybutadiene (Comparative Example 9) with an MWD of 4.53 at 60 minutes.

Testing Methods

Mooney Viscosity

The Mooney viscosity (ML$_{1+4}$) of the polymers were determined at 100° C. by using a Alpha Technologies Mooney viscometer with a large rotor, a one-minute warm-up time, and a four-minute running time.

Gel Permeation Chromatography (GPC) and Fourier Transform Infrared Spectroscopy (FTIR)

The molecular weight (Mn, Mw and Mp-peak Mn of GPC curve) and molecular weight distribution (Mw/Mn) were determined by GPC. The microstructure (cis, trans and vinyl contents) of the polymer was determined by FTIR.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A method of producing 1,4-polybutadiene comprising: polymerizing a solution comprising conjugated diene monomer, organic solvent, H$_2$O, and catalyst to yield the 1,4-polybutadiene having a cis content of between about 92% to about 98%, a vinyl content of about 1% to about 4%, a trans content of about 1 to about 4%, a molecular weight distribution (MWD) of about 3 to about 5, and a Mooney viscosity (ML$_{1+4}$) at 100° C. of less than 60, wherein the polymerization achieves over an 80% conversion of the conjugated diene monomer when catalyzed with the catalyst comprising:
at least one organonickel compound;
at least one organoaluminum activator compound;
BF$_3$ in a mixture of H$_2$O and hexanol,
wherein the catalyst has a molar ratio of Ni element to H$_2$O from about 0.05 to about 20 and a molar ratio of BF$_3$ to H$_2$O is from about 1.8 to about 500.

2. The method of claim 1, wherein the molar ratio of BF$_3$ to H$_2$O is about 2 to about 100.

3. The method of claim 2, wherein the molar ratio of BF$_3$ to H$_2$O is about 2 to about 15.

4. The method of claim 1, wherein the molar ratio of Ni element to H$_2$O is about 0.05 to about 15.

5. The method of claim 1, wherein the cis content is about 95% to about 97%.

6. The method of claim 1, wherein the trans content is about 1.5% to about 2.5%.

7. The method of claim 1, wherein the trans content is less than about 2%.

8. The method of claim 1, wherein the Mooney viscosity at 100° C. is about 50 or less.

9. The method of claim 1, wherein the vinyl content is between about 1% to about 3%.

10. The method of claim 1, wherein the MWD is about 3 to about 4.

11. The method of claim 1, wherein the organonickel compound is a nickel boroacylate.

12. The method of claim 1, wherein the organoaluminum activator compound is triisobutyl aluminum (TIBA).

13. The method of claim 1, wherein the conjugated diene monomer is 1,3 butadiene.

14. The method of claim 1, wherein the organic solvent is hexane.

* * * * *